United States Patent [19]
Suey

[11] 3,937,249
[45] Feb. 10, 1976

[54] CHECK VALVE

[75] Inventor: David P. Suey, St. Louis County, Mo.

[73] Assignee: Valley Steel Products Company, St. Louis, Mo.

[22] Filed: Sept. 18, 1974

[21] Appl. No.: 506,955

[52] U.S. Cl. ............................ 137/543.13; 251/337
[51] Int. Cl.² ......................................... F16K 15/06
[58] Field of Search ...... 137/540, 542, 543, 543.13; 251/337

[56] References Cited
UNITED STATES PATENTS

| 731,218 | 6/1903 | Perkins ...................... 137/543.13 X |
| 1,860,004 | 5/1932 | Yardley ......................... 137/543.13 |
| 2,233,649 | 3/1941 | Stahl et al. ...................... 137/543.13 |
| 2,594,641 | 4/1952 | Griffith et al. ...................... 137/543 |
| 2,949,928 | 8/1960 | Hobson ........................... 137/542 X |
| 3,662,761 | 5/1972 | Hoffman ......................... 251/337 X |
| 3,695,577 | 10/1972 | Jespersen ....................... 251/337 X |
| 3,756,273 | 9/1973 | Hengesbach ................ 137/543.13 X |

*Primary Examiner*—William R. Cline
*Attorney, Agent, or Firm*—Gravely, Lieder & Woodruff

[57] ABSTRACT

A check valve for fluid flow lines and for pump discharge lines in which the components are arranged to assist in the prevention of sand and foreign material holding the check valve element open, in which the assembly and disassembly of the several components is performed from one end of the housing which receives the check valve, and in which support means are employed on both sides of the check valve, with one of the support means acting to prevent check valve spin but free to accommodate lateral displacement of the check valve and the other support means having a minimum area to prohibit sand and abrasive material lodging in or adjacent the area relied upon to support the movement of the check valve.

7 Claims, 5 Drawing Figures

CHECK VALVE

BRIEF SUMMARY OF THE INVENTION

This invention is principally concerned with improvements in check valves for fluid flow control at the discharge of a pump used to deliver a flow of fluid, such as water from an underground source or well.

The pumping of water from the source is always subject to the entrainment of some sand or grit which is harmful to the moving parts of the pump. It is important with submerged pumps to provide a check valve at the pump discharge so that in non-pumping periods the fluid in the delivery line will not drain back through the pump. At the same time the check valve must be light weight for fast response and must be free operating.

Accordingly, it is a principal object of this invention to provide a check valve which has a simple structure for ease of assembly and for reduction of cost or repair should the operating components require attention.

A presently preferred check valve assembly comprises a housing having a chamber formed with an apertured wall across one end and a pair of pockets in opposed relation on opposite sides of said chamber and spaced away from said aperture wall in the direction of flow through said chamber, support means mounted in said apertured wall, a check valve movably engaged with said support means and guided into a position closing said wall aperture, a guide pin projecting from said check valve into said chamber between said pair of pockets, a guide pin collar engaged on said guide pin, an elongated support means engaged by said collar and having opposite ends seated in said pockets, and a resilient element engaged on said check valve and on said collar and normally urging said check valve into the wall aperture closing position.

BRIEF DESCRIPTION OF THE DRAWINGS

A preferred embodiment of this invention is shown in the accompanying drawings, wherein.

DETAILED DESCRIPTION OF THE EMBODIMENT

The fluid flow check valve now to be described in a presently preferred embodiment is suitable to be incorporated in the discharge of a submersible pump. This application, however, is not to be taken as imposing unnecessary limitations.

Figure 2:
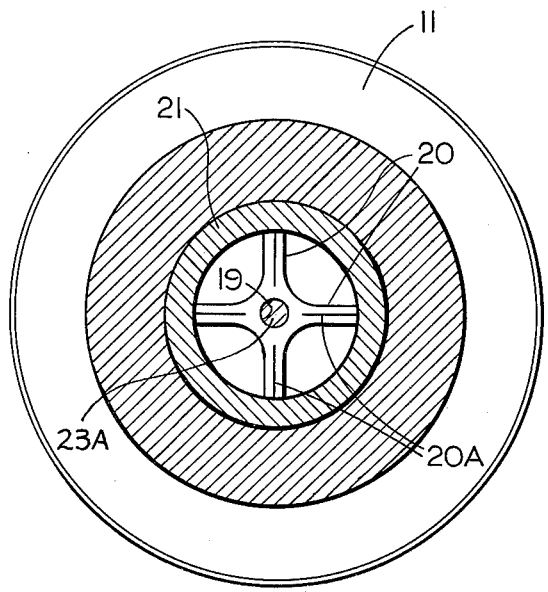
FIG. 2 is a transverse section view taken at line 2—2 in FIG. 1.

In the drawing the structure includes a valve housing 10 having an enlarged and externally threaded ring 11 adapted to screw into the body of the submersible pump (not shown) or the source of fluid moved under pressure. The housing has an outlet end 12 provided with internal threads to receive a flow delivery pipe 13. Housing 10 encloses a chamber 14 above a wall 15 adjacent the inlet end ring 11, and the wall 15 is formed with an aperture 16 and a shoulder 17. A support means 18 is seated in the aperture 16 on the shoulder 17 so that the center aperture 19 in the means is centered in the aperture 16 by a plurality of radially directed arms 20 (FIG. 2). This means is formed of very thin material and has minimum area presented to the abrasive effect of sand and grit that may be carried by the fluid. For stiffness, each arm 20 is slightly creased along the lines 20A to form a shallow V in section.

Figure 1:
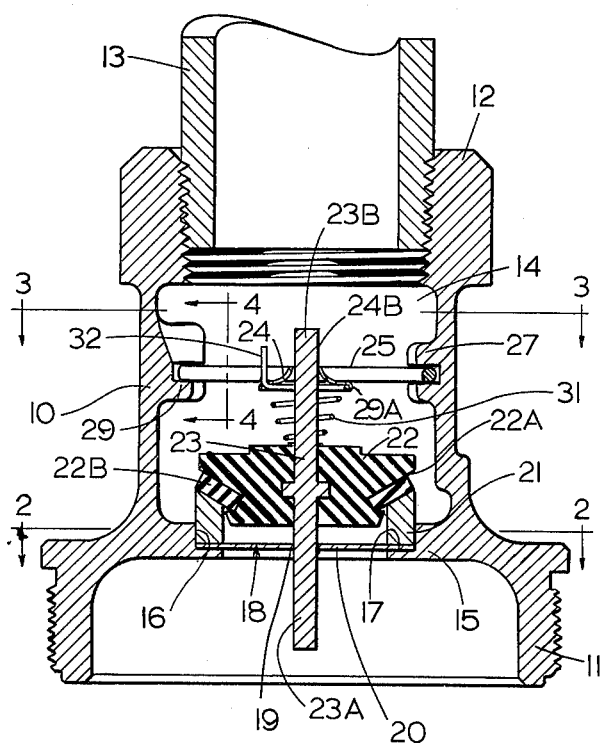
FIG. 1 is a sectional elevation of a pump discharge check valve housing in which the present check valve is operatively mounted.

The support means 18 is held in place by inserting a valve seat ring 21 in the aperture 16 so that the bevelled seat face is presented to the chamber 14. The check valve 22 is formed with an annular groove 22A to receive a suitable washer 22B and retain the washer at an angle to substantially match the bevelled face of the valve seat ring 21. It is preferred to mold or otherwise form the body of the check valve about an elongated guide pin 23 so that one end 23A will extend through the center aperture 19 in the support 18 while the opposite end 23B extends into the chamber 14. The guide pin 23 and the body of the check valve 22 are interlocked by a projection on the pin 23 (FIG. 1).

Figure 5:
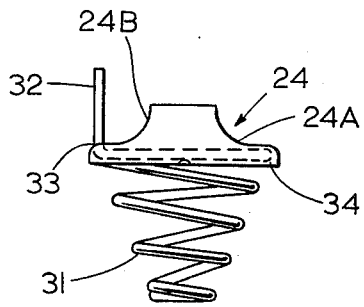
FIG. 5 is a fragmentary view of the means to retain the resilient spring means in operative position, this view being an enlargement of the showing in FIG. 1.
Figure 3:
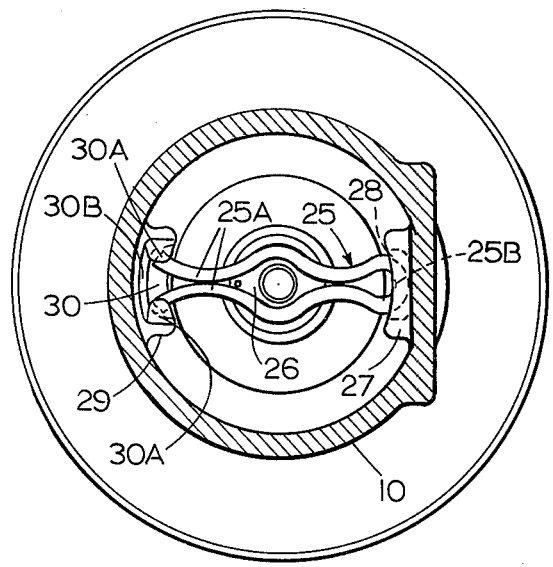
FIG. 3 is a further transverse section view taken at line 3—3 in FIG. 1.

The guide pin end 23B is slidably engaged in collar 24, and the collar is supported by an elongated support means 25 directed transversly of the chamber 14. As may be seen in FIG. 5 the collar 24 is formed with a flared end 24A opening toward the check valve and an oppositely directed neck 24B reduced in diameter to receive the end 23B of the guide pin in a working fit. The collar support means 25 is in the form of a hair pin in which a pair of legs 25A (FIG. 3) lie in the same plane and are connected at the end loop or bight 25B. The opposite ends of the legs 25A are bent apart, and between the ends the element 25 has the legs 25A parted to form a central space or seat 26 which receives the collar 24 at its surface between the neck 24B and the flared end 24A.

The elongated support means 25 is removably carried in the chamber 14 by and between an inwardly projecting pocket 27 having a radially oriented opening 28 and a second inwardly projecting pocket 29 set diametrally opposite the first described pocket 27. However, pocket 29 is formed with a slotted opening 30 having slanted surfaces 30A forming an entrance to the opening 30 which spreads out under the slanted surfaces 30A. It can be understood that the support means is mounted in the chamber 14 by first inserting the end 25B into the opening 28 of pocket 27, and then by aligning the bent ends of the legs 25A on the slanted surfaces 30A at pocket 29 and forcing each end into the opening 30 so that each end will spread out and be retained against accidental escape.

While the elongated support means 25 is formed with a seat space 26 for the collar 24, it requires a resilient element 31 to hold the collar in position and to react on the check valve 22 to urge it into closed position on the seat ring 21. The element 31 is formed as a conical spring and is positioned with the small end bearing on the check valve 22. The enlarged end of the spring 31 is seated in the flared end 24A of the collar 24 and the lip 34 is crimped at a plurality of places over the last spring turn. In addition, the spring is formed with a tang 32 which is fitted into a hole 33 in the collar for positively locking these parts against relative rotation. While the collar 24 is spring loaded for self-centering, the shape of the neck 24B and flared end 24A allows the collar to orient itself in the seat space 26 of the retainer element 25 so that the guide pin 23B may have sufficient lateral movement to assure the check valve 22 will seat and seal on the valve seat ring 21. The collar (FIG. 5) is shaped to present no surface on which sand or grit might gather to cause wear or faulty operation of the check valve 22. Also, the support means 18 have its radial arms reduced in surface area so that sand and grit cannot accumulate, and so that the least resistance or obstruction to fluid flow is obtained.

Figure 4:
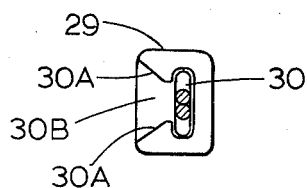
FIG. 4 is a fragmentary view of the means for detachably confining the check valve retainer.

Having set forth the description of a preferred embodiment, it is evident now that the following advantages and improvements are present. The internal components of the housing 14 are sized to pass through the end 12 whereby repair or replacement can be accomplished by removing the hairpin support means 25 and extracting the components. The collar under spring load tends at all times to hold the legs 25A of the support 25 in secure engagement in the pockets 27 and 29. Since the collar and spring (FIG. 5) are engaged by the spring tang 32, the check valve 22 is prevented from spinning which causes wear and premature failure of the washer 22B. If the valve were permitted to spin it would cause the guide pin 23, the aperture 19 in the support 18 and the collar 24 to wear out rapidly. This is prevented by locking the collar to the spring and the spring to the support. This prevention of valve spin is aided by having the small end turn of the spring received over the guide pin 23B with an interference fit. The hairpin support means 25 presents a minimum of surface in the chamber 14 to the flow of fluid and can be formed of spring wire which is heat treated for strength. The pocket 29 for the ends of the legs 25A is formed with angular or slanted surfaces 30A and with a third slanted surface 30B (FIG. 4) thereby acting to force the bight end 25B into the opposite pocket 27. The flow passage in the housing 10 is free of guide vanes and obstructing structure, thereby permitting a substantial weight reduction without sacrificing strength.

It should now appear that the features of this invention reside in a check valve assembly which includes a housing 10 having a wall 15 with an aperture 16, a check valve body 22, a support means 18 adjacent the aperture 16, a guide pin 23A engaged between the valve body 22 and the support 18 to direct the valve body movement into the position (FIG. 1) closing the aperture 16, resilient means 31 bearing upon and normally holding the valve body 22 in the aperture closing position, and means to retain the resilient means 31 in operative position comprising the elongated support 25 removably engaged with the housing 10, a collar 24 engaged with the resilient element 31 and the support 25, and other means (such as the guide pin portion 23B) engaged between the valve body and the collar to direct the movement of the valve body to open the aperture. The resilient means 31 is readily responsive to the fluid flow to open the check valve, but assures positive closing to prevent reverse flow.

What is claimed is:

1. A fluid flow check valve comprising: a housing having an inlet end and a discharge end and a chamber therebetween; a valve seat in said housing adjacent said inlet end; a valve member engageable with said valve seat; and means to direct the movement of said valve member into and out of engagement with said valve seat consisting of an elongated guide means on said valve member, a first support for said guide means carried by said housing in a portion between said valve member and said discharge end of said housing, said first support including a collar formed with a body having a flared end and an oppositely directed neck opening slidably engaged about said guide means, and a conical spring element having a large end seated in said flared end of said collar and the small end engaged on said valve member, said spring element acting to close said valve member upon said valve seat, and a second support for and engaged by said guide means carried by said housing adjacent said inlet end of said housing, said first and second supports permitting said valve member and guide means to move laterally for seating of said valve member on said valve seat.

2. The check valve of claim 1 wherein said second support includes a thin flat body member having a central aperture and arms projecting radially from said member into engagement with said housing, said arms being creased along the lengths thereof for stiffening the same, and said valve seat is an annular member disposed upon said second support.

3. A fluid flow check valve comprising: a housing having an inlet end and a discharge end and a chamber therebetween; a valve seat in said housing adjacent said inlet end; a valve member engagable with said valve seat; and means to direct the movement of said valve member into and out of engagement with said valve seat consisting of an elongated guide means on said valve member, a first support for said guide means carried by said housing in a portion between said valve member and said discharge end of said housing, said first support including an elongated element formed with a pair of legs integrally connected at one end and extending along side each other to the opposite ends which are spaced apart, said first support having an opening intermediate its length for passage of said guide means to direct movement of said valve member, recessed projections in said housing providing pockets for the reception of said ends of said first support, one of said pockets being formed with a slotted opening for the passage of said spaced apart ends of said first support, and a second support for said guide means carried by said housing adjacent said inlet end of said housing, said first and second supports permitting said valve member and guide means to move laterally for seating of said valve member on said valve seat.

4. A fluid flow check valve assembly comprising a housing having a chamber formed with an apertured wall across one end and a pair of pockets in opposed relation on opposite sides of said chamber and spaced away from said aperture wall in the direction of flow through said chamber, one of said pockets being formed with an opening directed inwardly of said chamber and the other pocket being formed with a slotted opening, support means mounted in said apertured wall, a check valve movably engaged on said support means and guided into a position closing said wall aperture, guide means projecting from said check valve into said chamber between said pair of pockets, a collar loosely engaged on said guide means, an elongated support having opposite ends seated in said pockets and positioned thereby to be engaged by and support said collar, said elongated support being formed with a pair of legs integrally joined at one end for engagement in said one pocket and the opposite end of said elongated support terminating with leg endings normally spaced apart and movable together for passage through said slotted opening of said other pocket to install and remove said elongated support, and a resilient element engaged on said check valve and on said collar and normally urging said check valve into the wall aperture closing position.

5. The fluid flow check valve of claim 4 wherein said collar is formed with a flared end to engage said resilient element and a shaped neck of less size than said flared end to receive said guide means projecting from said check valve.

6. The fluid flow check valve of claim 5 wherein said flared end of said collar forms a seat for said resilient element, and said collar, elongated element and resilient element are interconnected against relative rotation.

7. In a check valve assembly the combination of: a housing having a wall with an aperture therethrough for the flow of fluid, a check valve body movable to open and close said aperture, a first support adjacent said aperture, guide means carried by said valve body and loosely engaged in said first support to direct said valve body movement into a position closing said aperture, resilient means in the form of a conical spring having a small end bearing on said valve body and an enlarged end remote from said valve body, said spring being adapted to normally hold said valve body in the aperture closing position, and means to retain said resilient means in operative position comprising the subcombination of a second support removably engaged with said housing on the side of said valve body remote from said housing aperture, a concically flared collar engaged with said second support and with said enlarged end of said resilient element, said second support having an enlarged opening therein and said collar having an operative engagement with said enlarged opening to permit lateral movement of said valve body during opening and closing movement of said valve body, a tang on said enlarged end of said resilient element directed to engage said flared collar and said second support, said guide means on said valve body extending through said conical spring and said collar, and said small end of said conical spring having an interference fit on said guide means to prevent rotation of said valve body during movement.

* * * * *